Aug. 21, 1962 H. H. RAUH 3,050,258
THERMAL VALVE
Filed Jan. 14, 1960 2 Sheets-Sheet 1
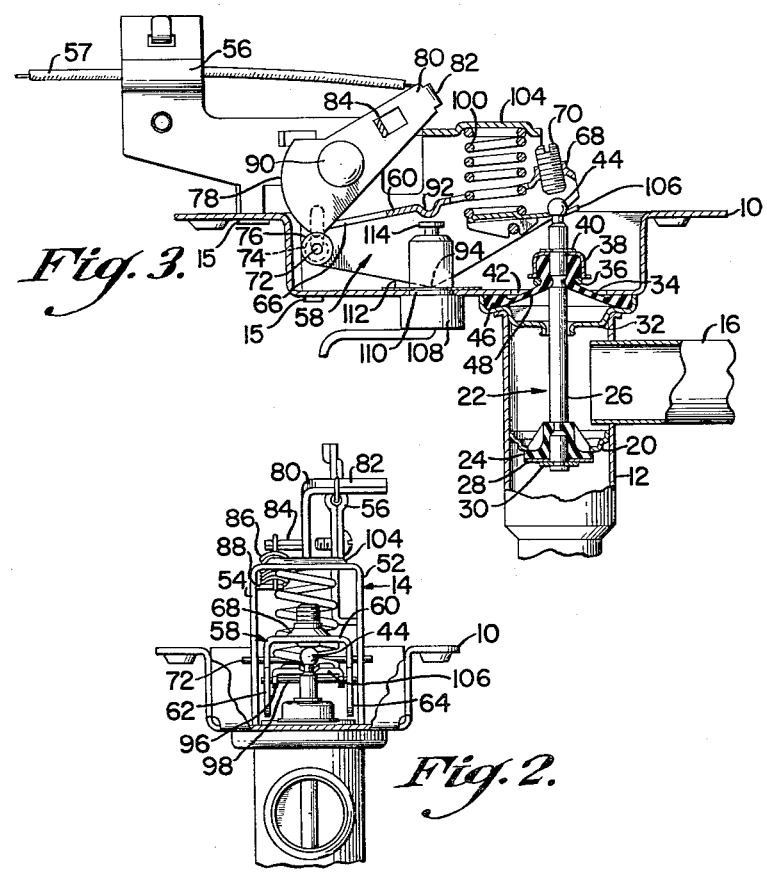
Fig. 3.
Fig. 2.
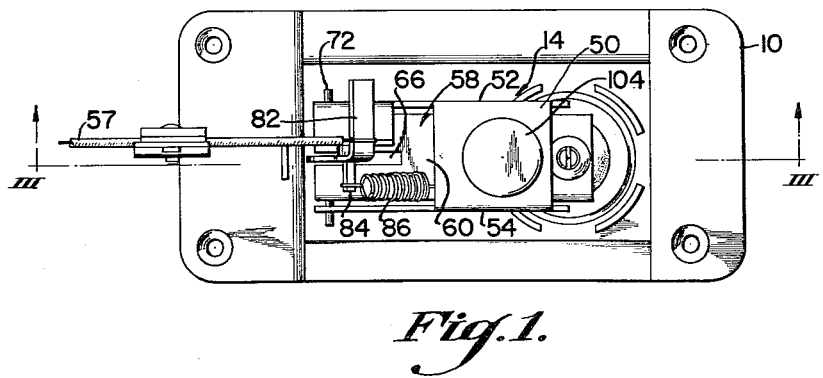
Fig. 1.

Aug. 21, 1962 H. H. RAUH 3,050,258
THERMAL VALVE
Filed Jan. 14, 1960 2 Sheets-Sheet 2

3,050,258
THERMAL VALVE
Herbert H. Rauh, Greensburg, Pa., assignor to Robertshaw-Fulton Controls Company, Richmond, Va., a corporation of Delaware
Filed Jan. 14, 1960, Ser. No. 2,430
3 Claims. (Cl. 236—99)

This invention relates to thermostatically controlled fluid valves and more particularly to a thermostatically controlled valve adapted to control the flow of fluid to a heat exchanger.

The primary object of this invention is to mount a power element to cooperate with a valve actuating mechanism during periods of use and to be operatively disassociated therefrom during periods of nonuse to eliminate pressure on the power element.

Another object of the present invention is to automatically control the flow of liquid through a heat exchanger and thereby control the temperature of the air passing over the heat exchanger.

Another object of the invention is to automatically urge a valve to the closed position in the event of failure of the valve actuating power element.

Other objects and advantages of the invention will become apparent from the following description taken in connection with the accompanying drawings wherein:

FIG. 1 is a top plan view;

FIG. 2 is an end view of the valve looking at the inlet side with a portion of the base member broken away to expose the operating mechanism;

FIG. 3 is an elevational view, partly in section, taken substantially on the plane III—III of FIG. 1 and showing the valve in its closed position;

Figure 5:
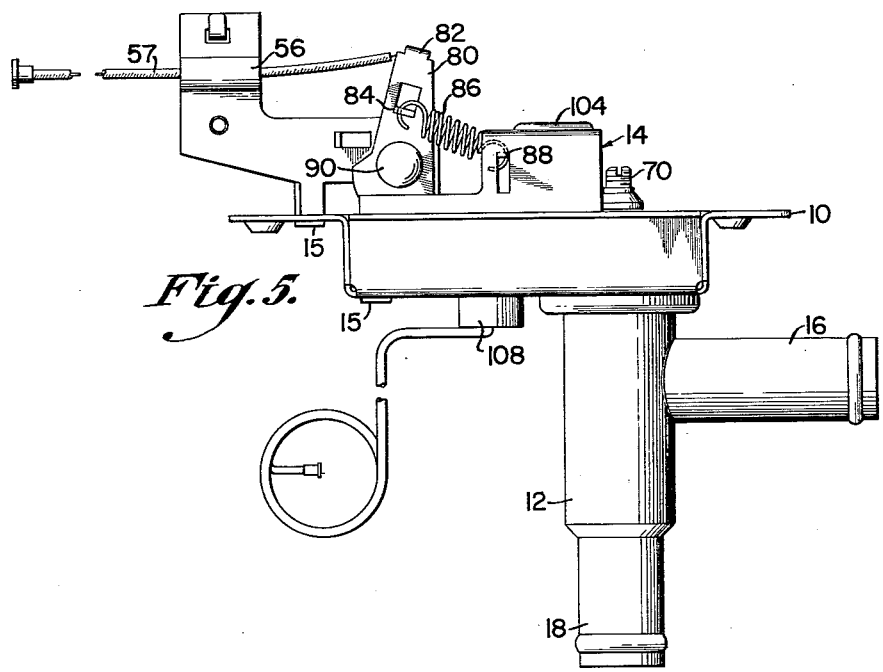
FIG. 5 is a view in side elevation of a valve embodying the invention.
Figure 4:
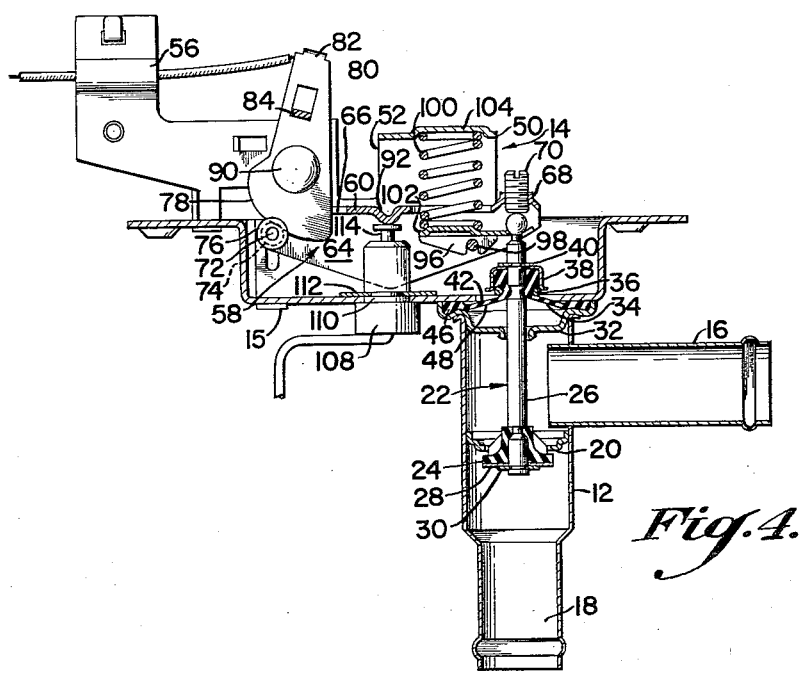
FIG. 4 is a vertical longitudinal section taken along the lines III—III of FIG. 1 and showing the valve in its open position.

This invention has particular but by no means exclusive utility when used for controlling the flow of liquid through a heat exchanger for heating the air inside the passenger compartment of an automobile in accordance with the temperature within the compartment and the desires of the passengers.

Referring more particularly to the drawings, the thermostatically controlled fluid valve comprises a base member 10 having a tubular valve casing 12 sealingly mounted on the underside thereof by soldering or any other suitable means. A cover assembly 14 is mounted by tabs 15 extending through the base plate 10, or any other suitable means, on the upper side of the base member 10. An inlet pipe 16 extends through a wall of the valve housing 12 and is secured therein by soldering or other suitable means. The valve housing 12 is provided with an area of reduced diameter forming an outlet 18. When the valve is employed in an automobile heater system, inlet pipe 16 is connected to receive heated water from the motor cooling system and outlet 18 is connected to the car heater.

A valve seat 20 is disposed within the valve casing 12 and is secured therein by soldering or other suitable means. A valve means, generally disclosed at 22, is also disposed with the casing 12 and reciprocates longitudinally of the housing to open and closed positions.

The valve means 22 comprises a head 24 mounted on a stem 26 by means of a washer 28 and a retaining ring 30. The valve stem 26 extends upwardly through a valve stem guide 32 and has mounted circumferentially thereon a diaphragm seal 34. The diaphragm seal 34 is held in position on the valve stem 26 by a seal spring 36, a seal cap 38, and a seal cap retaining ring 40.

The valve stem 26 extends further through an opening 42 provided in the base member 10 and terminates in a spherical head portion 44. The diaphragm seal 34 is provided with a circumferential bead portion 46 sealably retained between the valve stem guide 32 and the base member 10. A web 48 extends radially outwardly from the valve stem 26 and provides a flexible wall in the valve casing 12 and the base member 10.

The cover assembly 14, mounted on the upper side of the base plate 10, comprises a ceiling portion 50 and a pair of opposed sidewalls 52 and 54. A clamp portion 56 is formed integral with the cover assembly 14 and provides means for supporting and positioning the manual operating wire 57.

An adjusting beam 58 is operatively positioned within the cover assembly 14 and comprises a web portion 60 and a pair of oppositely disposed leg portions 62, 64. A longitudinal slot 66 is formed in the web portion 60 adjacent one end of the adjusting beam 58 and a threaded aperture 68, adapted to receive a calibrating screw 70, is positioned at the other end.

Extending between the leg portions 62, 64 of the adjusting beam 58 and supported thereby is a pin 72. A roller 74, having a circumferential recess 76, is rotatively mounted on the pin 72 and positioned to receive the cam portion 78 of a cam lever 80. The cam lever 80 is provided with a lug 82 formed at one end thereof and extending substantially at right angles thereto. A spring engaging portion 84 is adapted to receive one end of a tension spring 86. A second lug 88 is formed in the wall 54 of the cover assembly 14 and extends inwardly thereof to receive the free end of the tension spring 86.

The cam lever 80 is rotatively attached to the cover assembly 14 by means of a rivet 90. An operating wire 57 is supported by the clamp 56 and its free end is operatively connected to the cam lever lug 82. Thus, it may be seen that operation of the Bowden wire 57 will cause the cam lever 82 to rotate about the rivet 90. The cam surface 78 of the cam lever 80 extends downwardly through the longitudinal slot 66 formed in the adjusting beam 58 and engages the circumferential recess 76 in the roller 74 for actuation thereof.

This adjusting beam 58 is further provided with a first pivot portion 92 located intermediate its ends and a second pivot portion 94 formed at the lower extremities of the leg portions 62, 64. An overstroke link 96 is pivotally mounted on the pin 98 which extends through the leg portions 62 and 64 of the adjusting beam 58. A main spring 100 engages an annular flange 102 on the overstroke link 96 at one end and is received in the spring seat 104 in the cover assembly 14 at its other end. With the main spring 100 thus positioned, the overstroke link 96 is biased in a counterclockwise direction about its pivot pin 98 while the adjusting beam 58 is biased in a clockwise direction and the several parts are resiliently secured in the assembled relation.

The overstroke link 96 is urged in rotation about its supporting pivot pin 98 and is provided with a notch 106 terminating in a circular aperture at one end. The aperture is adapted to engage the lower surface of the spherical head 44 of the valve stem 26 and thus provide a connection between the adjusting beam 58 and the valve stem 26.

A power element 108 is secured in an aperture 110 provided in the base plate 10 by means of a locking washer 112. The power element 108 is positioned to extend upwardly through the aperture 110 and between the leg portions 62, 64 of the adjusting beam 58, thereby placing the actuating pin 114 of the power element 108 in operative relationship with the first pivot 92 of the adjusting beam 58. It is significant that the power element 108 is so constructed and positioned that when it is in its contracted state, that is, when it is relatively cold, the thermally responsive fluid therein occupies the least volumetric area and the actuating pin 114 will be completely disengaged from the pivot 92 on the adjusting beam 58. The adjusting beam 58 will rest on the pivot 94 at the extremities of the leg portions 62, 64 and thus no pressure is placed on the power element during periods of nonuse. Furthermore, the adjusting beam 58 will remain totally disengaged from the power element 108 regardless of the position of the cam lever 80 so long as the power element is in the contracted state. In an automobile heater system, floor element 108 is connected to respond to variations in temperature inside the passenger compartment of the car by confining the thermally responsive fluid which actuates element 108 within a conduit and control bulb indicated in FIG. 5 which are located to sense temperature within the passenger compartment.

Operation

Referring to FIG. 3, the valve means 22 is shown in its closed position permitting no fluid to flow to the heat exchanger. It is noted that with the valve means 22 in this position, the cam lever 80 is rotated clockwise its fullest extent and the tension on spring 86 is relaxed. In this position of the cam lever 80, the adjusting beam 58 has been rotated about pivot 94, depressing the end engaged by the cam lever 80 and lifting the end engaging the valve stem 26 against the main spring 100 and thereby raising the valve stem 26 to seat the valve head 24 against its seat 20. It is further noted that under these conditions the adjusting beam 58 and the actuating pin 114 of the power element 108 are operatively disassociated and, accordingly, no pressure is placed on the power element 108 during periods when the thermally responsive power element 108 is contracted.

Assume now that it is desired to open the valve means 22 and allow fluid to flow to the heat exchanger. If the atmospheric temperature is relatively warm, it will be necessary to supply only a limited amount of hot water to the heat exchanger to elevate the temperature of the outside air supplied to the passenger compartment. Accordingly, the control cable 57 is pulled to rotate the cam lever 80 a short distance in the counterclockwise direction. Rotation of the cam lever 80 imparts a rotation to the adjusting beam 58 by allowing the main spring 100 to urge the adjusting beam 58 to rotate in a clockwise direction about the pivot point 94. The clockwise rotation of the adjusting beam 58 results in a downward movement of the overstroke link 96. The overstroke link 96, being in operative engagement with the valve stem 26, also imparts a downward movement to the valve head 24, thereby moving it an increment of its stroke and out of engagement with the seat 20, thereby allowing fluid to flow to the heat exchanger.

If the temperature of the air entering the passenger compartment should increase after the valve member has been initially opened, the fluid in the power element 108 will expand driving the actuating pin 114 upwardly. The actuating pin 114 will engage the pivot 92 on the web portion 60 of the adjusting beam 58 and thereby lift the adjusting beam 58 off of the pivot 94. The adjusting beam 58 is forced upwardly against the main spring 100 and initially pivots about the roller 74, which roller is in operative engagement with the cam surface 78 of the cam lever 80.

The adjusting beam 58, being urged by the expanding power element 108 to rotate in a counterclockwise direction about the roller 74, causes the valve stem 26 to be urged upwardly engaging the valve head 24 with its seat 20 and closing the flow path. Thus, the air is supplied to the passenger compartment at a preselected temperature under automatic control to maintain the temperature.

If, on the other hand, the atmospheric temperature becomes relatively low, it becomes necessary to supply a greater volume of hot water to the heat exchanger to elevate the temperature of the air entering the passenger compartment. Under these conditions, the cam lever 80 is rotated a greater distance and the valve means 22 is opened to allow a greater volume of hot water to pass through the valve means 22 and thus the air supplied to the passenger compartment will be at a much higher predetermined temperature and will be automatically controlled to maintain this higher predetermined temperature.

This invention, therefore, enable the occupant of the pasenger compartment of a vehicle to select the heat range of the valve means 22 compatible with the atmospheric temperature by merely pushing or pulling the control cable 57 to vary the position of the cam lever 80. When the position of the cam lever 80 has been changed, the valve means 22 will automatically maintain the temperature of the air entering the passenger compartment within the desired range.

While only one embodiment of the present invention has been shown and described herein, it will be apparent that various changes may be made in the form and arrangement of parts without departing from the scope of the invention as defined in the appended claims.

I claim:

1. In a thermostatically controlled fluid valve comprising a housing, a valve casing mounted on said housing, a valve means within said casing movable between a first and a second position, a U-shaped adjusting beam having a web portion and oppositely disposed substantially triangular downwardly extending leg portions, a first pivot on said web portion intermediate the ends thereof and a second pivot at the extremity of said leg portions and in vertical alignment with said first pivot when said web portion of said adjusting beam is horizontally disposed, said adjusting beam being positioned to operatively engage said valve means for movement between open and closed positions, lever means disposed on said housing and adapted to operatively engage said adjusting beam to rotate said adjusting beam about said first and second pivots in one direction, resilient means engaging said housing and said adjusting beam for rotating said adjusting beam in an opposite direction, and thermally expansive means supported by said housing and having an actuating pin movable in response to an increase in temperature to operatively engage said first pivot and move said valve means between said first and second positions.

2. A thermostatic valve assembly comprising a housing, valve means within said housing movable between an open and a closed position, an elongate adjusting beam having a central web and leg members projecting downwardly from the opposed sides of said web, means on the lower ends of said leg members engageable with said housing to define a first horizontal axis of pivotal movement of said beam relative to said housing, said first axis extending in a direction normal to the length of said beam at a location intermediate the ends thereof, means at one end of said beam coupled to said valve means for moving said valve means between said open and said closed positions in response to vertical movement of said one end of said beam, resilient means biasing said one end of said beam downwardly, roller means mounted on the other end of said beam, temperature selecting cam means on said housing engaging said roller means and cooperable with said resilient means to vertically position said other end of said beam relative to said first horizontal axis, and thermally responsive means on said housing including an actuating member mounted for vertical movement toward and away from the lower side of said web at a location intermediate the ends of said beam in response to variations in temperature, said actuating member being operable upon a preselected temperature change to engage said web and pivot said beam upwardly about a second horizontal axis defined by the engagement between said cam means and said roller means.

3. In a thermostatically controlled valve assembly having a valve head mounted for vertical movement between an open and a closed position; an elongate adjusting beam, means at one end of said beam coupled to said valve head for moving said valve head vertically in accordance with vertical movement of said one end of said beam, resilient means biasing said one end of said beam downwardly, downwardly facing abutment means upon said beam intermediate the ends thereof engageable with upwardly facing abutment means on said housing to define a first horizontal axis of pivotal movement of said beam relative to said housing extending transversely of said beam, temperature responsive means including an actuating member vertically movable relative to said housing beneath said beam into and out of engagement with the lower side of said beam in response to ambient temperature variations, temperature selecting cam means movably mounted upon said housing, cam follower means on the other end of said beam engaging said cam means in horizontal line contact, said cam means being cooperable with said cam follower means to position said beam angularly about said first horizontal axis to cause said actuating member to engage the lower side of said beam at a selected ambient temperature, said actuating member being operable upon upward movement in engagement with said beam to swing said beam upwardly about a second horizontal axis defined by the line of contact between said cam means and said cam follower means.

References Cited in the file of this patent

UNITED STATES PATENTS

| | | |
|---|---|---|
| 1,236,335 | Meacham | Aug. 7, 1917 |
| 2,855,152 | Tyler et al. | Oct. 7, 1958 |
| 2,855,153 | Tyler | Oct. 7, 1958 |